US012491309B2

(12) United States Patent
Sekiguchi et al.

(10) Patent No.: US 12,491,309 B2
(45) Date of Patent: Dec. 9, 2025

(54) INFUSION PUMP

(71) Applicant: TERUMO KABUSHIKI KAISHA, Tokyo (JP)

(72) Inventors: Shota Sekiguchi, Hadano (JP); Makoto Hasegawa, Ebina (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 1176 days.

(21) Appl. No.: 17/382,030

(22) Filed: Jul. 21, 2021

(65) Prior Publication Data

US 2021/0346610 A1   Nov. 11, 2021

Related U.S. Application Data

(63) Continuation of application No. PCT/JP2019/048779, filed on Dec. 12, 2019.

(30) Foreign Application Priority Data

Jan. 22, 2019   (JP) .................................. 2019-008794

(51) Int. Cl.
A61M 5/142 (2006.01)
A61M 5/168 (2006.01)
A61M 5/36 (2006.01)

(52) U.S. Cl.
CPC ........ *A61M 5/142* (2013.01); *A61M 5/16813* (2013.01); *A61M 5/365* (2013.01); *A61M 2005/16863* (2013.01)

(58) Field of Classification Search
CPC ........ A61M 2005/16863; A61M 5/142; A61M 5/16813; A61M 5/365
See application file for complete search history.

(56) References Cited

U.S. PATENT DOCUMENTS 4,944,485 A   7/1990 Daoud et al.
5,672,887 A   9/1997 Shaw et al.
(Continued)

FOREIGN PATENT DOCUMENTS

CN   103702698 A   4/2014
JP   H10-513395 A   12/1998
(Continued)

OTHER PUBLICATIONS

Written Opinion of the International Search Authority, dated Feb. 25, 2020, issued in corresponding PCT Application No. PCT/JP2019/048779 (13 pages).

(Continued)

*Primary Examiner* — Shefali D Patel

(74) *Attorney, Agent, or Firm* — Foley & Lardner LLP

(57) ABSTRACT

An infusion pump includes: a main body configured to have an infusion tube fixed thereto, wherein the main body includes: a first fixing unit, a second fixing unit that is movable between (i) a pressing position in which the infusion tube is pressed against the first fixing unit, and (ii) a release position in which the pressing of the infusion tube against the first fixing unit is released, by being rotated with respect to a rotary shaft, an urging unit configured to urge the second fixing unit toward the release position, the urging unit comprising an urging member mounted on the rotary shaft, a transmission unit configured to transmit a signal toward the infusion tube sandwiched between the first fixing unit and the second fixing unit, and a reception unit configured to receive the signal transmitted from the transmission unit.

10 Claims, 9 Drawing Sheets

(56) References Cited

U.S. PATENT DOCUMENTS

| 9,168,337 | B2 | 10/2015 | Miyazaki |
| 2008/0098798 | A1 | 5/2008 | Riley et al. |
| 2014/0371707 | A1 | 12/2014 | Sullivan et al. |
| 2015/0224254 | A1 | 8/2015 | Sullivan et al. |
| 2016/0136413 | A1 | 5/2016 | Russell et al. |

FOREIGN PATENT DOCUMENTS

| JP | 2004-057577 A | 2/2004 |
| JP | 2010-508518 A | 3/2010 |
| JP | 2012-029915 A | 2/2012 |
| WO | WO-2014/049660 A1 | 4/2014 |

OTHER PUBLICATIONS

International Searching Authority, "International Searching Authority," issued in connection with International Patent Application No. PCT/JP2019/048779, dated Feb. 25, 2020.

International Searching Authority, "Written Opinion," issued in connection with International Patent Application No. PCT/JP2019/048779, dated Feb. 25, 2020.

First Chinese Office Action and Search Report issued in connection with CN Appl. Ser. No. 201980069977.X dated May 25, 2022 (16 pages).

European Extended Search Report, dated Dec. 20, 2021, issued in corresponding European Patent Application No. 19911879.5, (7 pages).

Office Action issued in European Appl. No. 19911879.5 dated Feb. 18, 2025.

INFUSION PUMP

CROSS-REFERENCE TO RELATED APPLICATIONS

The present application is a bypass continuation of PCT Application No. PCT/JP2019/048779, filed on Dec. 12, 2019, which claims priority to Japanese Application No. 2019-008794, filed on Jan. 22, 2019.

BACKGROUND

The present disclosure relates to an infusion pump.

Conventionally, there is known an infusion pump to which an infusion tube connected with an infusion bag is fixed and that is capable of controlling a flow rate per unit time of a liquid such as a chemical solution in the infusion tube to be administered into a living body.

JP 2012-029915 A discloses an infusion pump including a main body and an openable and closable door. The main body of the infusion pump disclosed in JP 2012-029915 A includes a first regulation member in which one of a transmission unit and a reception unit of an air bubble detection sensor is arranged, and a second regulation member in which the other of the transmission unit and the reception unit of the air bubble detection sensor is arranged. In addition, in the infusion pump of JP 2012-029915 A, the second regulation member is movable between a pressing position in which an infusion tube is pressed against the first regulation member and a release position in which the pressing of the infusion tube against the first regulation member is released. Furthermore, the infusion pump of JP 2012-029915 A is provided with an urging member that urges the second regulation member in a direction toward the release position.

SUMMARY

According to the infusion pump described in JP 2012-029915 A, the second regulation member is configured to be movable and, thus, infusion tubes having different outer diameters can be easily positioned at a predetermined position; however, there is still room for improvement from the viewpoint of miniaturizing the pump.

An object of the present disclosure is to provide an infusion pump having a configuration in which infusion tubes having different outer diameters can be easily positioned and that facilitates miniaturization.

According to one embodiment, an infusion pump includes a main body to which an infusion tube is fixed. The main body includes: a first fixing unit; a second fixing unit that is movable between a pressing position in which the infusion tube is pressed against the first fixing unit and a release position in which the pressing of the infusion tube against the first fixing unit is released; an urging unit that urges the second fixing unit toward the release position; a transmission unit that is disposed in one of the first fixing unit and the second fixing unit and transmits a predetermined signal toward the infusion tube sandwiched between the first fixing unit and the second fixing unit; and a reception unit that is disposed in the other of the first fixing unit and the second fixing unit and receives a signal transmitted from the transmission unit. The second fixing unit is movable between the pressing position and the release position by being rotated with respect to a rotary shaft. The urging unit is formed of an urging member mounted on the rotary shaft.

According to one aspect of the above embodiment, the infusion pump includes a door that is attached to be openable and closable with respect to the main body, and the door includes a pressing portion that presses the second fixing unit toward the pressing position against an urging force of the urging member when the door is closed with respect to the main body.

According to another aspect of the above embodiment, the rotary shaft and the urging member are located on a side opposite to the door across the second fixing unit and the door in a state in which the door is closed with respect to the main body.

According to another aspect of the above embodiment, the door includes a position holding portion that abuts on the infusion tube and holds a position of the infusion tube between the first fixing unit and the second fixing unit when the door is closed with respect to the main body.

According to another aspect of the above embodiment, the position holding portion includes a curved recess that receives an outer peripheral surface of the infusion tube.

According to another aspect of the above embodiment, the position holding portion is provided with respect to the pressing portion in both of a feeding direction of the infusion tube fixed to the main body and a direction opposite to the feeding direction.

According to another aspect of the above embodiment, the second fixing unit is exposed to an outside of the main body, the rotary shaft and the urging member are accommodated inside the main body, and the main body includes a liquid obstructing unit that obstructs a liquid entering into the main body from the outside of the main body around the second fixing unit.

According to another aspect of the above embodiment, the liquid obstructing unit includes a deformable portion that deforms following movement of the second fixing unit with respect to the first fixing unit.

According to certain embodiments of the present disclosure, it is possible to provide the infusion pump having a configuration in which infusion tubes having different outer diameters can be easily positioned and that facilitates miniaturization.

DETAILED DESCRIPTION

Figure 1:
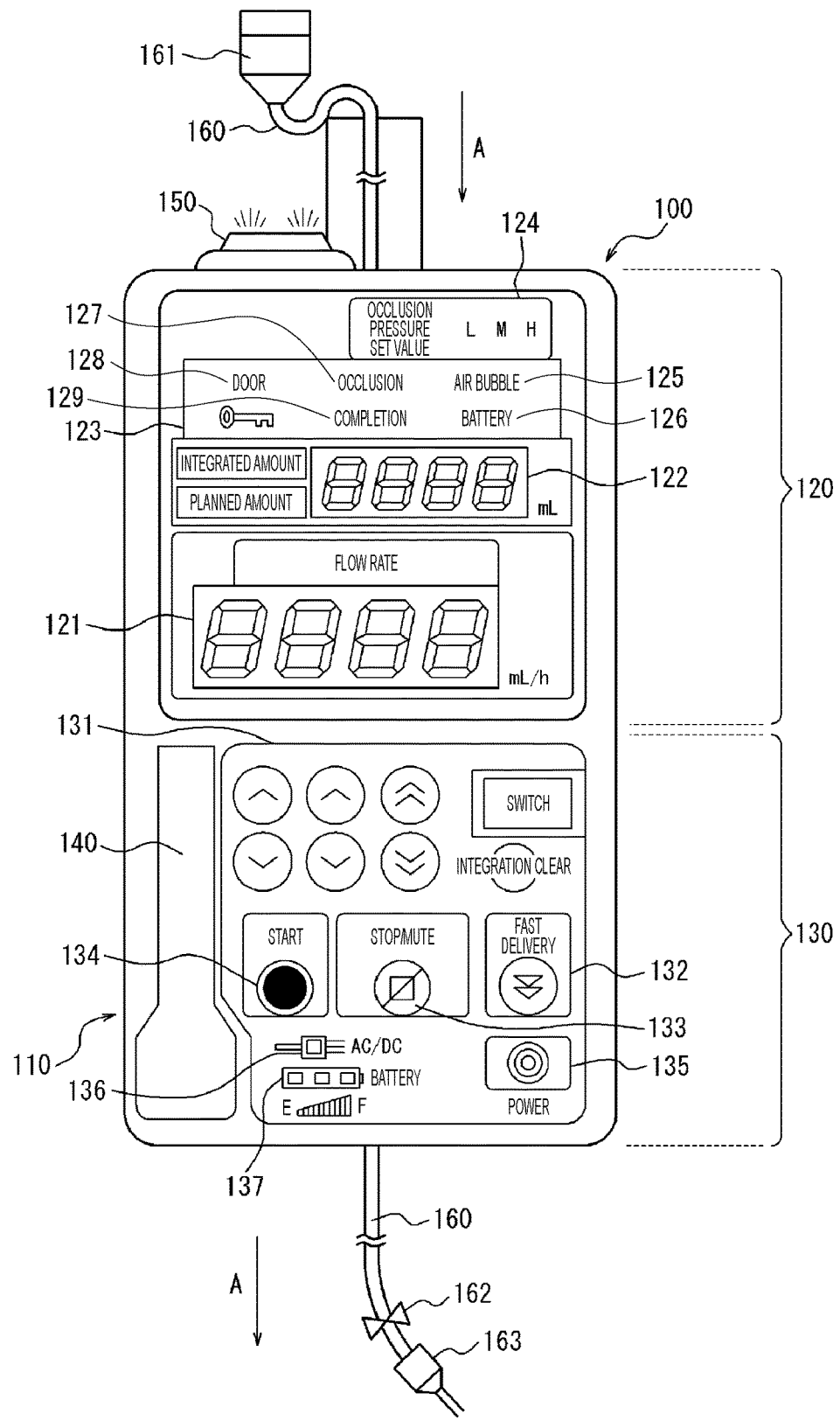
FIG. 1 is a view illustrating an example of an external configuration of an infusion pump according to an embodiment of the present disclosure, and is a front view of the infusion pump in a state in which a door is closed with respect to a main body.

Hereinafter, embodiments of an infusion pump according to the present disclosure will be described with reference to the drawings. The same reference numerals are used for common members and portions in the drawings.

Figure 2:
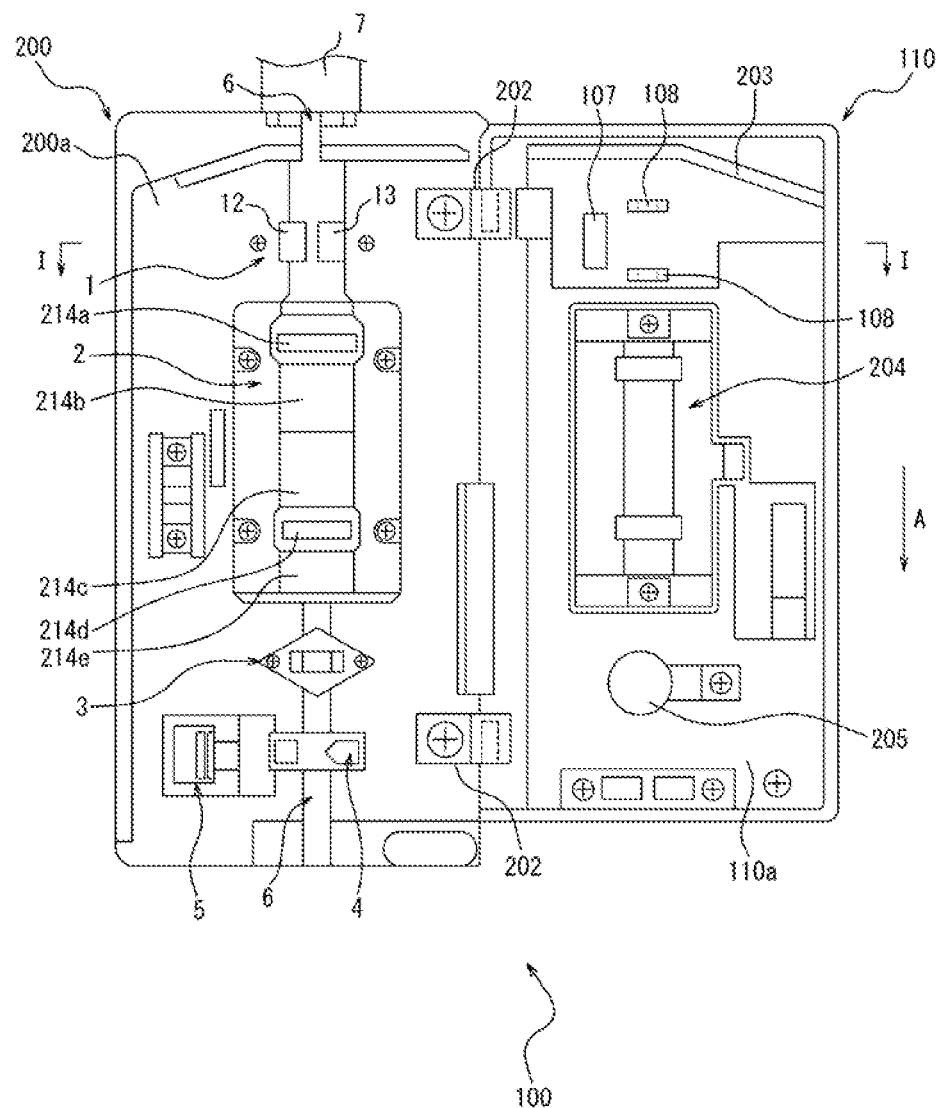
FIG. 2 is a front view of the infusion pump illustrated in FIG. 1 in a state in which the door is open with respect to the main body.

FIG. 1 is a view illustrating an example of an external configuration of an infusion pump 100 according to an embodiment of the present disclosure. FIG. 1 is a front view of the infusion pump 100 in a state in which a door 110 is closed with respect to a main body 200 (see FIG. 2). In addition, the infusion pump 100 of FIG. 1 illustrates a state in which an infusion tube 160 is fixed. FIG. 2 is a front view of the infusion pump 100 in a state in which the door 110 is open with respect to the main body 200. Therefore, the front surface of the main body 200 and the back surface of the door 110 are exposed in FIG. 2. In addition, the infusion pump 100 of in FIG. 2 illustrates a state in which the infusion tube 160 is not mounted.

Hereinafter, a state in which the door 110 is closed with respect to the main body 200 (see FIG. 1) will be simply referred to as a "closed state" for convenience of description. In addition, a state in which the door 110 is not closed with respect to the main body 200 (for example, a state illustrated in FIG. 2) will be simply referred to as an "open state" for convenience of description.

As illustrated in FIG. 1, the infusion tube 160 is fixed to the infusion pump 100. Although details will be described below, in the infusion pump 100 of the present embodiment, the infusion tube 160 is fixed to the main body 200 of the infusion pump 100 as the door 110 is made to be in the closed state from the state in which the door 110 is open and the infusion tube 160 is arranged at a predetermined position of the main body 200. An infusion bag 161 containing a liquid such as a predetermined chemical solution is connected to the upstream side of a flow path of the infusion tube 160 (direction opposite to a feeding direction A) with respect to a portion of the infusion tube 160 fixed to the infusion pump 100. In addition, a clamp member 162 and an indwelling needle 163 are connected to the downstream side of the flow path (feeding direction A) of the infusion tube 160 with respect to the portion of the infusion tube 160 fixed to the infusion pump 100. The indwelling needle 163 is indwelled in a state of puncturing a vein or the like of a patient. A flow rate (feeding speed) of the liquid per unit time or the like in the infusion tube 160 is controlled by using the infusion pump 100. Therefore, the amount of the liquid in the infusion bag 161 administered to the patient per unit time and the like can be controlled by the infusion pump 100.

First, a summary of the infusion pump 100 of the present embodiment will be provided.

As illustrated in FIGS. 1 and 2, the infusion pump 100 includes the main body 200 and the door 110 attached to the main body 200 so as to be openable and closable.

As illustrated in FIG. 1, a display unit 120 on which various types of information are displayed, an operation unit 130 in which operation switches and the like are arrayed, and a door lock lever 140 are disposed on a front surface of the door 110. In addition, an operation indicator 150 is disposed on an upper surface of the door 110.

The display unit 120 is provided with a flow rate display unit 121 in which a set value and an actual value of the feeding speed are displayed in a switched manner, a planned amount/integrated amount display unit 122 that displays a planned flow rate and an integrated flow rate in a switched manner, an alarm display unit 123 that displays various types of alarm information, and an occlusion pressure setting display unit 124 in which a set level of an occlusion pressure of the infusion tube 160 is displayed as "L", "M", or "H".

The alarm display unit 123 is further provided with an air bubble detection display unit 125 that is turned on when an air bubble detection sensor 1 (see FIG. 2) to be described below detects an air bubble in the infusion tube 160, and a battery voltage drop display unit 126 that is turned on when a voltage of a built-in battery of the infusion pump 100 drops. Furthermore, the alarm display unit 123 is provided with an occlusion abnormality display unit 127 that is turned on when the occlusion pressure of the infusion tube 160 reaches the set level, a door open state display unit 128 that is turned on when the door 110 is open, and a completion display unit 129 that is turned on when an infusion is completed.

The operation unit 130 is provided with an up/down switch 131 configured to set a feeding speed and a planned flow rate, a fast delivery switch 132 that enables feeding at a feeding speed higher than a set feeding speed (mL/h) while being pressed, a start switch 134 that starts an infusion by being pressed, a stop switch 133 that forcibly stops the infusion by being pressed, and a power switch 135 configured to instruct ON/OFF of the power of the main body 200.

A power lamp 136, which is turned on when commercial power or DC power is used, and a battery lamp 137, which is turned on during charging of the built-in battery and displays the remaining capacity of the built-in battery, are disposed adjacent to the power switch 135.

In addition, the operation indicator 150 disposed on an upper surface of the main body has a function of notifying a feeding state of the infusion pump 100, and is rotationally turned on in a predetermined color (for example, green) during feeding, and is turned on or blinks in a predetermined color (for example, red) different from that during feeding when feeding is stopped due to an abnormality.

Next, the main body 200 of the infusion pump 100 and a configuration on the back surface side of the door 110 will be described. A position of the infusion tube 160 illustrated in FIG. 1 is fixed between the door 110 and the main body 200.

As illustrated in FIG. 2, the main body 200 includes the air bubble detection sensor 1, a pump mechanism 2, an occlusion sensor 3, a tube clamp holding portion 4, a release lever 5, and a tube regulating portion 6.

The air bubble detection sensor 1 detects the presence or absence of an air bubble in the fixed infusion tube 160 (see FIG. 1) while the door 110 is in the closed state. Although details will be described below, the air bubble detection sensor 1 of the present embodiment is formed of a sensor assembly 10 (see FIG. 5 and the like) mounted on a main body housing 200a that is a casing of the main body 200. In the present embodiment, the presence or absence of the air bubble in the infusion tube 160 (see FIG. 1) is detected by a predetermined signal such as an ultrasonic wave transmitted and received by a transmission unit 15 (see FIG. 5) and a reception unit 16 (see FIG. 5) of the sensor assembly 10.

The pump mechanism 2 is provided with a plurality of fingers 214a, 214b, 214c, 214d, and 214e that sequentially press the infusion tube 160 (see FIG. 1) to closed by pressure and are arrayed from the flow path upstream side to the flow path downstream side of the infusion tube 160 (toward the feeding direction A).

The occlusion sensor 3 includes a permanent magnet and a pickup configured to detect a movement amount of the permanent magnet in an analog manner. The occlusion sensor 3 detects the movement amount of the permanent magnet that has moved in accordance with an internal pressure change accompanying an occlusion state of the infusion tube 160 (see FIG. 1), thereby detecting the occlusion state of the infusion tube 160 (see FIG. 1).

The tube clamp holding portion 4 holds a clamp attached to the infusion tube 160 (see FIG. 1), and applies a pressing force for temporarily closing the infusion tube 160 (see FIG. 1) by pressure to the clamp when the door 110 is open.

The release lever 5 is operated by an operator such as a medical worker to release the application of the pressing force to the clamp by the tube clamp holding portion 4 (that is, release the pressure-closing of the infusion tube 160 (see FIG. 1) by the clamp).

The tube regulating portion 6 regulates a position in a direction orthogonal to an extending direction of the infusion tube 160 (see FIG. 1) when the infusion tube 160 (see FIG. 1) is mounted on the main body 200.

As illustrated in FIG. 2, the main body 200 may further include a handle 7 configured to be gripped by a user when carrying the infusion pump 100.

As illustrated in FIG. 2, the door 110 includes a door housing 110a, and the door housing 110a is rotatably attached to the main body housing 200a of the main body 200 via a hinge 202. In this manner, the door 110 of the present embodiment is configured to be openable and closable with respect to the main body 200.

A door seal rubber 203, which is made of an elastomer and prevents a chemical solution from entering into the main body 200 while the door 110 is in the closed state, is disposed on the back surface side of the door 110.

A pressing portion 107 is disposed on the back surface side of the door 110. When the door 110 is closed with respect to the main body 200, the pressing portion 107 presses a second fixing unit 13 of the sensor assembly 10 to be described below (see FIG. 5 and the like). Details thereof will be described below.

In addition, a position holding portion 108 is disposed on the back surface side of the door 110. When the door 110 is closed with respect to the main body 200, the position holding portion 108 abuts on the infusion tube 160 (see FIG. 1) and holds the infusion tube 160 at a fixed position in the main body 200. Details thereof will be described below.

In addition, a buffer plate mechanism 204 is disposed on the back surface side of the door 110. When the infusion tube 160 (see FIG. 1) is sequentially pressed by the plurality of fingers 214a to 214e while the door 110 is in the closed state, the buffer plate mechanism 204 supports the infusion tube 160 (see FIG. 1) from the door 110 side.

Furthermore, an occlusion pressing plate 205 is disposed on the back surface side of the door 110. The occlusion pressing plate 205 sandwiches the infusion tube 160 (see FIG. 1) with the above-described occlusion sensor 3 while the door 110 is in the closed state.

Next, details of the air bubble detection sensor 1 of the main body 200 will be described.

Figure 3:
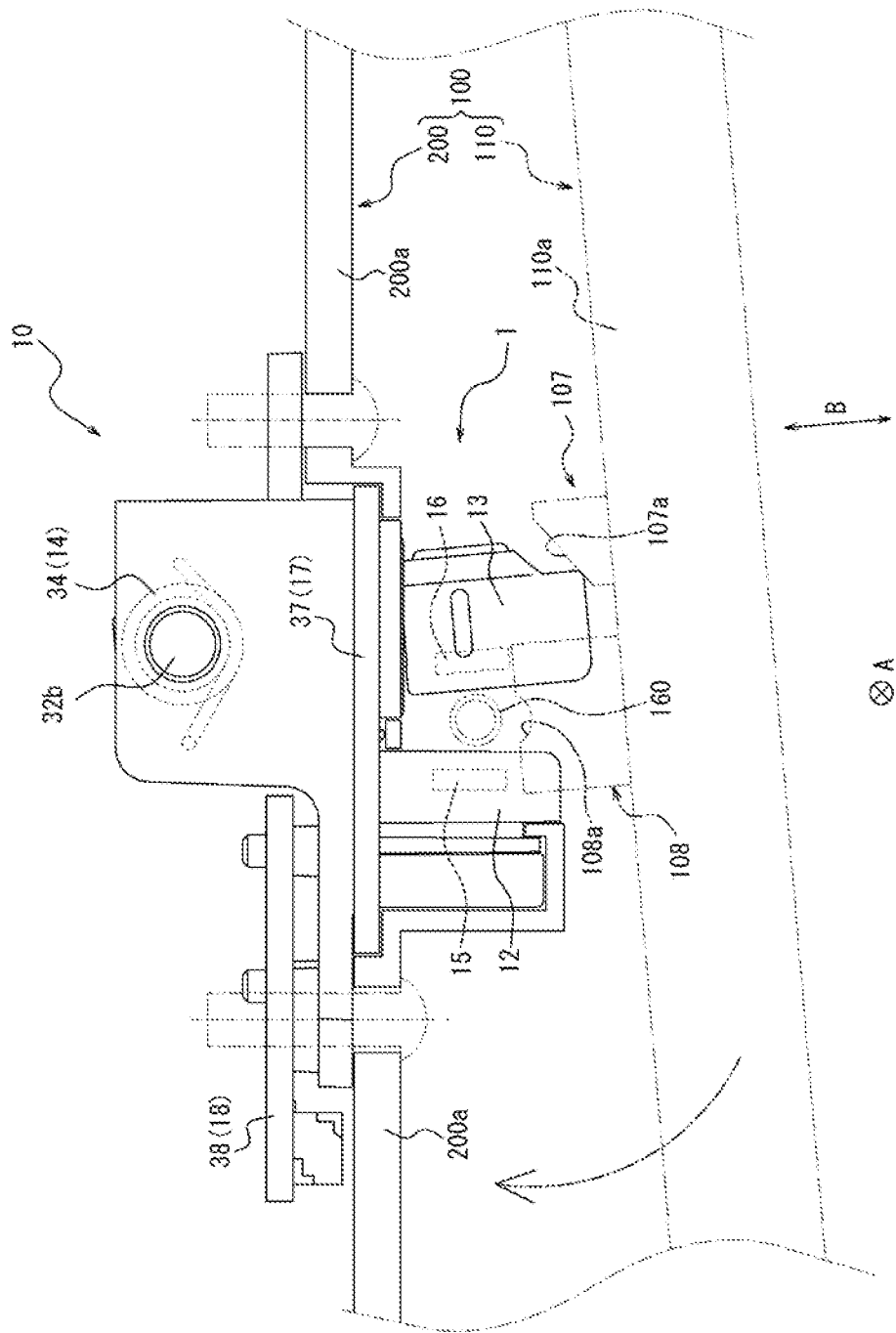
FIG. 3 is a view illustrating an air bubble detection sensor of the main body illustrated in FIG. 2 and a vicinity thereof.
Figure 4:
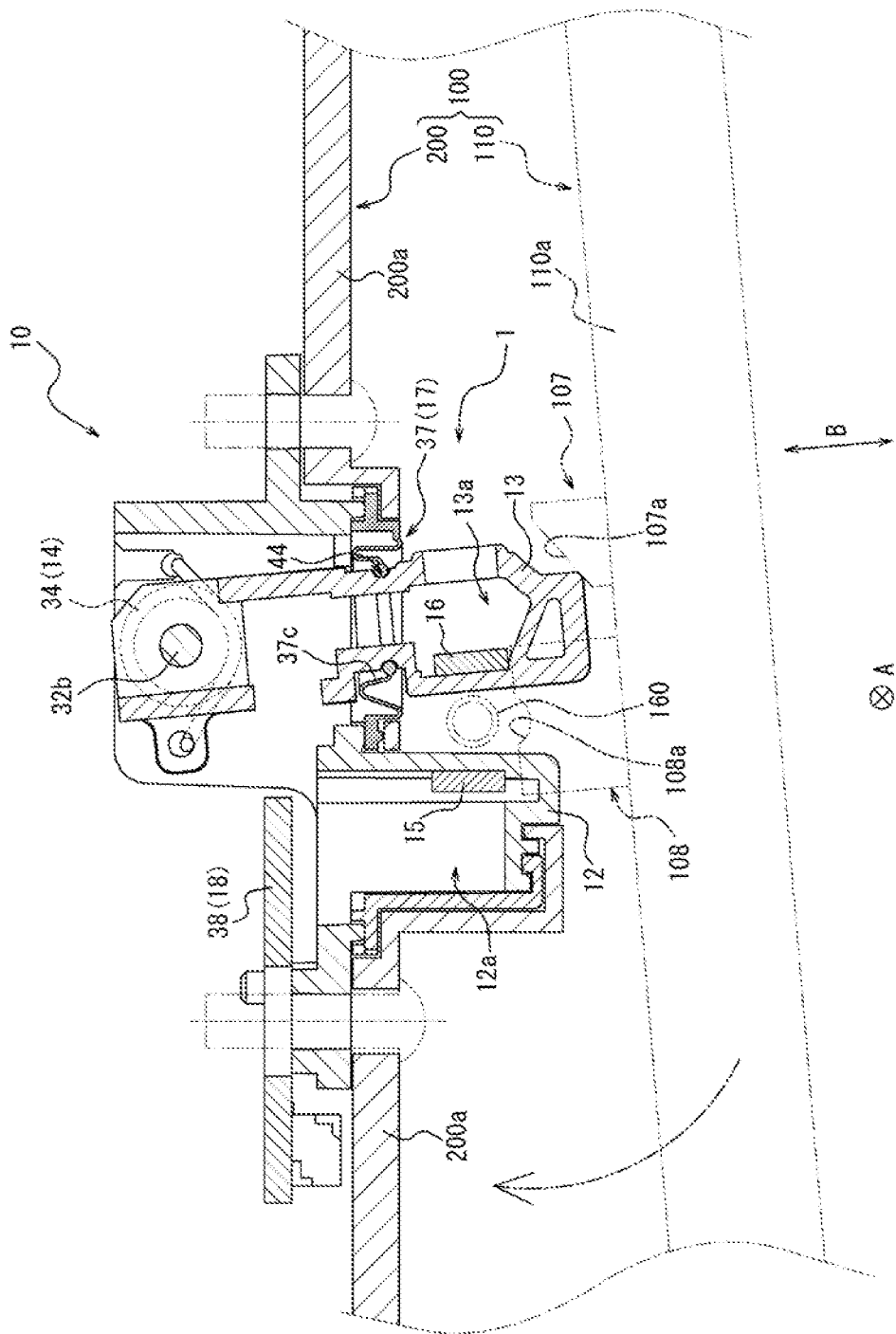
FIG. 4 is an enlarged cross-sectional view illustrating the air bubble detection sensor and the vicinity thereof in a cross section taken along the line I-I in FIG. 2.

FIG. 3 is a view illustrating the air bubble detection sensor 1 of the main body 200 of the present embodiment and a vicinity thereof. FIG. 3 illustrates a positional relationship between the sensor assembly 10 and the main body housing 200a in a state in which the sensor assembly 10 forming the air bubble detection sensor 1 is attached to the main body housing 200a of the main body 200. The positional relationship between the sensor assembly 10 and the main body housing 200a illustrated in FIG. 3 is a positional relationship when the sensor assembly 10 and the main body housing 200a are viewed along the feeding direction A. In addition, the door 110 in the open state is indicated by a two-dot chain line in FIG. 3 for convenience of the description. Furthermore, the infusion tube 160 arranged at a predetermined position for fixing to the main body 200 is indicated by a two-dot chain line in FIG. 3 for convenience of the description. FIG. 4 is an enlarged view of the air bubble detection sensor 1 and the vicinity thereof in a cross section taken along line I-I in FIG. 2.

As illustrated in FIGS. 3 and 4, the air bubble detection sensor 1 of the main body 200 according to the present embodiment includes the first fixing unit 12, a second fixing unit 13, an urging unit 14, a transmission unit 15, a reception unit 16, a liquid obstructing unit 17, and a control unit 18 are provided. As described above, the air bubble detection sensor 1 of the present embodiment is configured using the sensor assembly 10 equipped with each of the above-described units and mounted on the main body housing 200a. Details of the sensor assembly 10 will be described below (see FIGS. 5 to 8).

The first fixing unit 12 sandwiches the infusion tube 160 with the second fixing unit 13 while the door 110 is in the closed state, and fixes a position of the infusion tube 160. The first fixing unit 12 of the present embodiment is fixed in position in the main body 200 and does not move. In addition, the first fixing unit 12 according to the present embodiment is formed of a protruding portion that protrudes from the main body housing 200a toward the front surface side through an opening of the main body housing 200a in the main body 200, as illustrated in FIGS. 3 and 4.

The second fixing unit 13 is movable between a pressing position and a release position. The pressing position is a position in which the infusion tube 160 is pressed against the first fixing unit 12. The release position is a release position in which the pressing of the infusion tube 160 against the first fixing unit 12 is released. More specifically, the release position in the present embodiment is a retraction position separated from the first fixing unit 12 farther than the pressing position. In this manner, the second fixing unit 13 can move between the pressing position in which the infusion tube 160 is sandwiched between the second fixing unit 13 and the first fixing unit 12 and the release position in which the infusion tube 160 is not sandwiched between the second fixing unit 13 and the first fixing unit 12 by moving relative to the first fixing unit 12. FIGS. 3 and 4 illustrate a state in which the second fixing unit 13 is at the release position. In addition, the second fixing unit 13 of the present embodiment is pressed by the pressing portion 107 of the door 110 when the state of the door 110 is changed from the open state to the closed state, details of which will be described below (see FIG. 9). As a result, the second fixing unit 13 of the present embodiment moves from the release position to the pressing position (see FIG. 9). On the other hand, when the state of the door 110 is changed from the closed state to the open state, the pressing by the pressing portion 107 of the door 110 is released in the second fixing unit 13 of the present embodiment. As a result, the second fixing unit 13 of the present embodiment moves from the pressing position to the release position (see FIGS. 3 and 4). In FIGS. 3 and 4, a position of the pressing portion 107 of the door 110 is indicated by a two-dot chain line for convenience of the description.

In addition, the second fixing unit 13 is rotatable with respect to a rotary shaft 32b. The second fixing unit 13 is movable between the pressing position and the release position by rotating with respect to the rotary shaft 32b. The rotary shaft 32b of the present embodiment extends in the feeding direction A, and the second fixing unit 13 of the present embodiment is rotatable in a plane orthogonal to the feeding direction A.

In addition, the second fixing unit 13 of the present embodiment is formed of a protruding portion that protrudes from the main body housing 200a toward the front surface side through the opening of the main body housing 200a in the main body 200. That is, as illustrated in FIGS. 3 and 4, the second fixing unit 13 of the present embodiment protrudes from the main body housing 200a toward the front surface side in the main body 200 similarly to the first fixing unit 12.

As illustrated in FIG. 4, the urging unit 14 urges the second fixing unit 13 toward the release position. In addition, the urging unit 14 is formed of an urging member 34 mounted on the rotary shaft 32b. The urging member 34 of the present embodiment is formed of a torsion coil spring although details will be described below.

As illustrated in FIGS. 3 and 4, the transmission unit 15 is disposed in one of the first fixing unit 12 and the second fixing unit 13. The transmission unit 15 of the present embodiment is disposed in the first fixing unit 12. In addition, the transmission unit 15 transmits a predetermined signal toward the infusion tube 160 sandwiched between the first fixing unit 12 and the second fixing unit 13. The predetermined signal can be configured as, for example, an ultrasonic wave. In addition, the reception unit 16 is disposed in the other of the first fixing unit 12 and the second fixing unit 13 as illustrated in FIGS. 3 and 4. The reception unit 16 of the present embodiment is disposed in the second fixing unit 13. In addition, the reception unit 16 receives the signal transmitted from the transmission unit 15. It is possible to detect the air bubble in the infusion tube 160 by using the transmission unit 15 and the reception unit 16.

As illustrated in FIGS. 3 and 4, the liquid obstructing unit 17 obstructs the liquid from entering into the main body 200 from the outside of the main body 200. Details of a seal member 37 forming the liquid obstructing unit 17 of the present embodiment will be described below.

As illustrated in FIGS. 3 and 4, the control unit 18 detects the presence or absence of the air bubble in the infusion tube 160 based on the signal transmitted from the transmission unit 15 and the signal received by the reception unit 16. The control unit 18 of the present embodiment is formed of a control board 38.

As described above, the air bubble detection sensor 1 of the main body 200 of the present embodiment is configured using the sensor assembly 10 attached to the main body housing 200a. Hereinafter, details of the sensor assembly 10 will be described.

Figure 5:
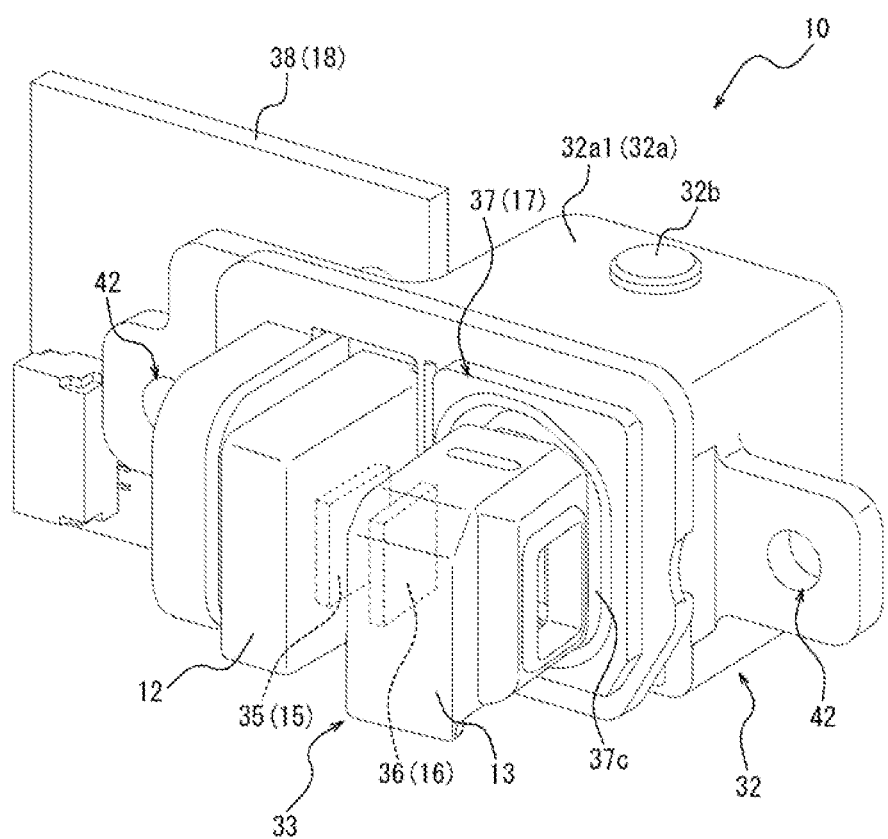
FIG. 5 is a perspective view illustrating a sensor assembly illustrated in FIG. 3.
Figure 6:
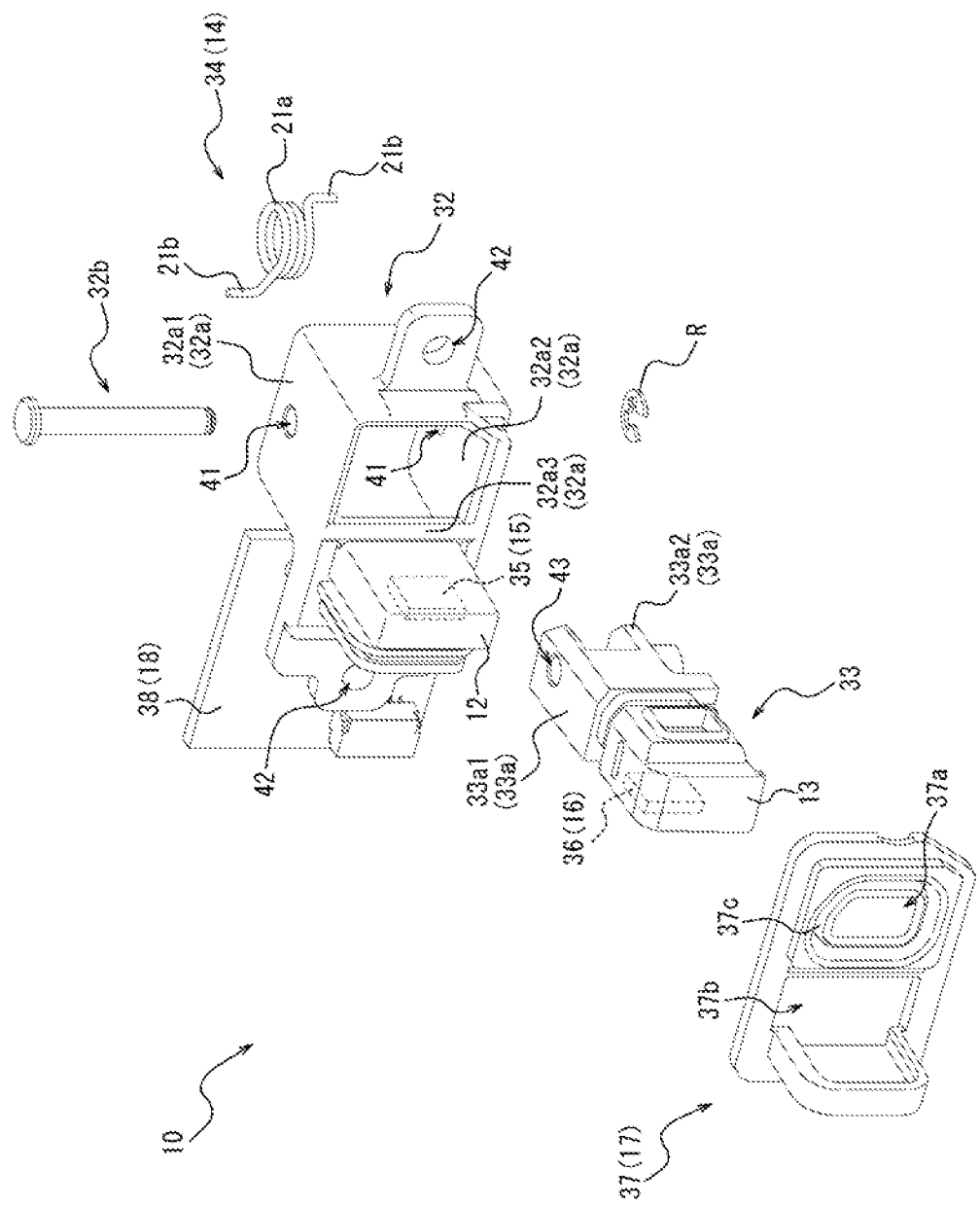
FIG. 6 is an exploded perspective view of the sensor assembly illustrated in FIG. 5.
Figure 7:
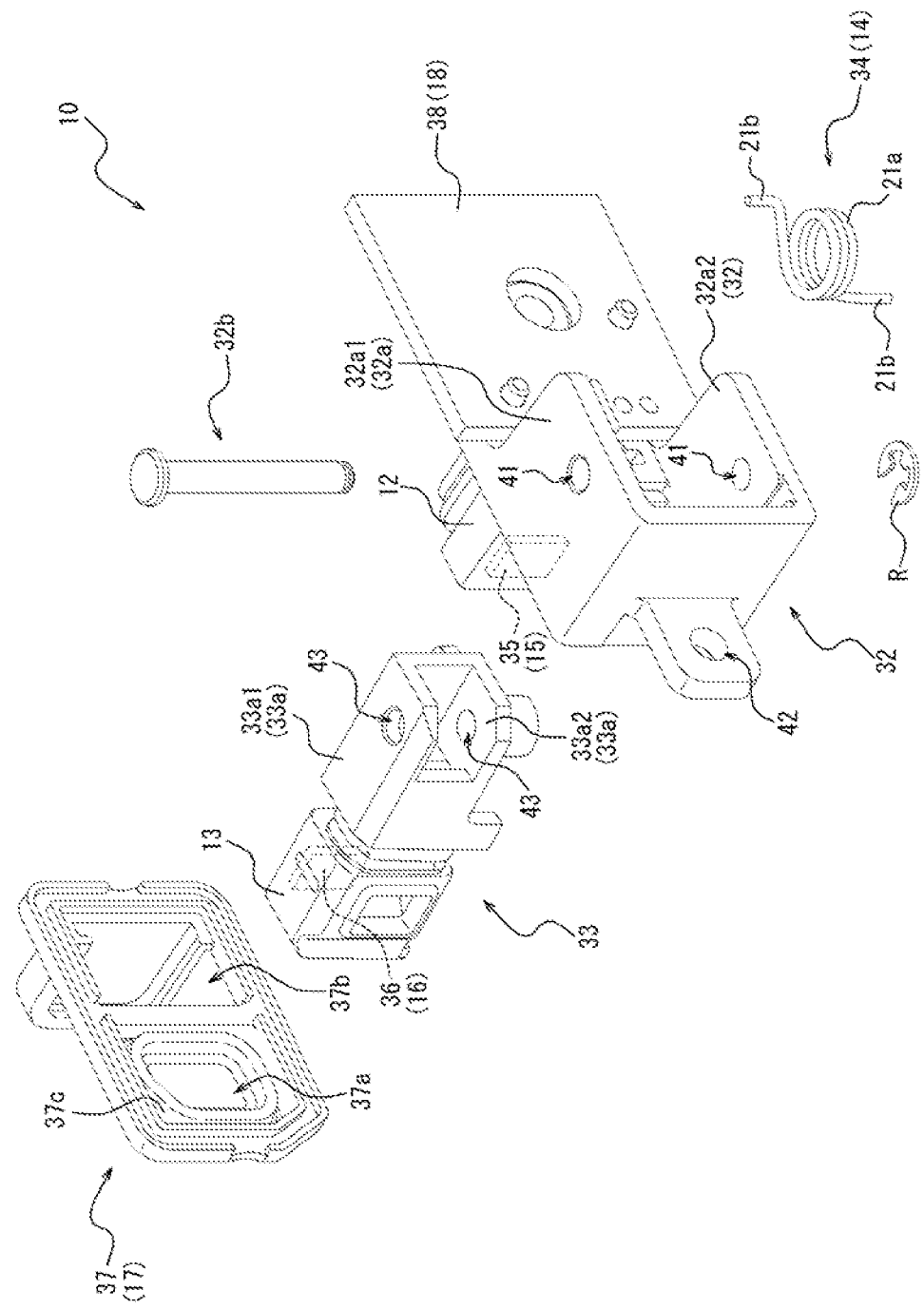
FIG. 7 is an exploded perspective view of the sensor assembly illustrated in FIG. 5 as viewed from a different viewpoint from FIG. 6.
Figure 8:
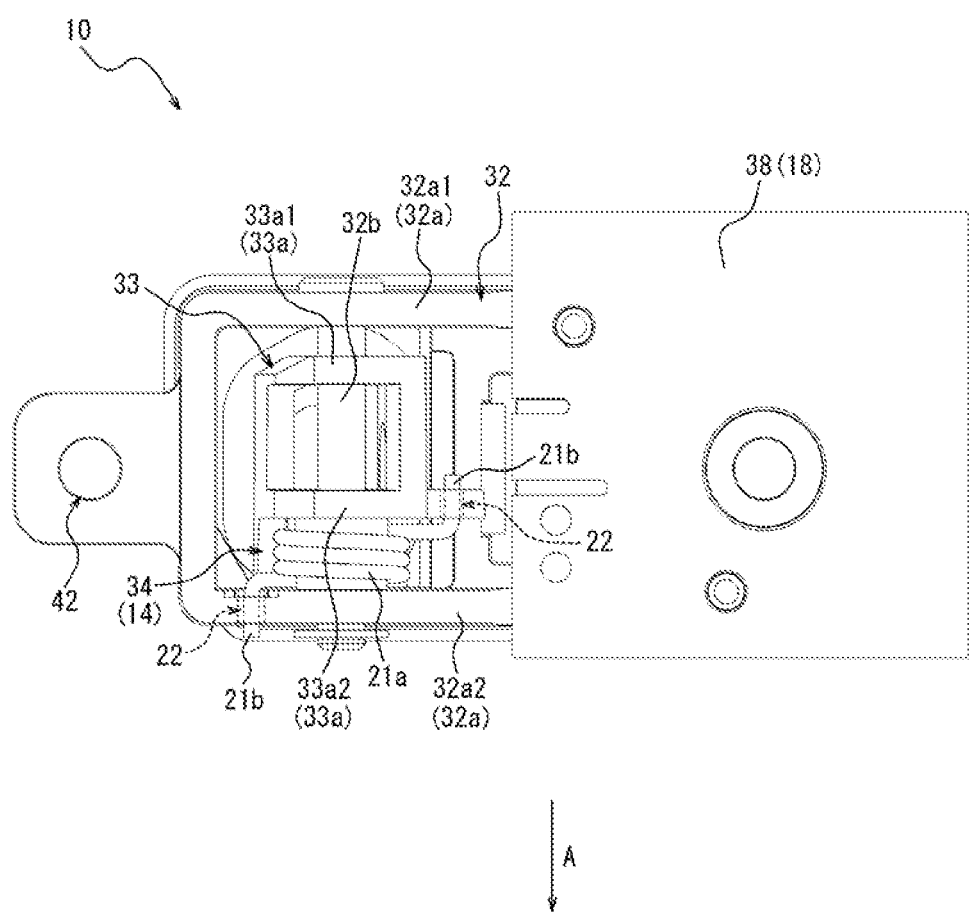
FIG. 8 is a rear view illustrating a rear side of the sensor assembly illustrated in FIG. 5.

FIG. 5 is a perspective view illustrating the sensor assembly 10. FIG. 6 is an exploded perspective view of the sensor assembly 10. In addition, FIG. 7 is an exploded perspective view of the sensor assembly 10 as viewed from a different viewpoint from FIG. 6. FIG. 8 is a rear view illustrating the back surface side of the sensor assembly 10.

As illustrated in FIGS. 3 to 8, the sensor assembly 10 forms the first fixing unit 12, the second fixing unit 13, the urging unit 14, the transmission unit 15, the reception unit 16, the liquid obstructing unit 17, and the control unit 18 in the air bubble detection sensor 1 of the main body 200. More specifically, the sensor assembly 10 includes a first fixing member 32 forming the above-described first fixing unit 12, a second fixing member 33 forming the above-described second fixing unit 13, an urging member 34 forming the above-described urging unit 14, a transmitter 35 forming the above-described transmission unit 15, a receiver 36 forming the above-described reception unit 16, the seal member 37 forming the above-described liquid obstructing unit 17, and the control board 38 forming the above-described control unit 18.

The first fixing member 32 includes an attachment main body 32a attached to the main body housing 200a of the main body 200, the rotary shaft 32b supported by the attachment main body 32a, and the above-described first fixing unit 12 protruding from the attachment main body 32a.

The second fixing member 33, the urging member 34, the transmitter 35, the receiver 36, the seal member 37, and the control board 38 are directly or indirectly attached to the attachment main body 32a of the first fixing member 32.

As illustrated in FIG. 6 and the like, the attachment main body 32a of the present embodiment includes a pair of plate portions 32a1 and 32a2 opposing each other with a space therebetween, and a connecting plate portion 32a3 connecting the pair of plate portions 32a1 and 32a2. Insertion holes 41 are formed in the pair of plate portions 32a1 and 32a2 at positions overlapping each other in the thickness direction.

Furthermore, an attachment hole 42 is formed in the attachment main body 32a of the present embodiment. A fastening member such as a screw is inserted through the attachment hole 42. That is, the sensor assembly 10 can be fixed to the main body housing 200a (see FIG. 3 and the like) of the main body 200 (see FIG. 3 and the like) by the fastening member, such as the screw, inserted into the attachment hole 42 of the attachment main body 32a.

The rotary shaft 32b is supported by the attachment main body 32a as described above. Specifically, the rotary shaft 32b of the present embodiment is formed separately from the attachment main body 32a, and is formed of a shaft member attached to the attachment main body 32a. The shaft member forming the rotary shaft 32b is attached to the pair of plate portions 32a1 and 32a2 using a snap ring R in the state of being inserted through the insertion holes 41 of the pair of plate portions 32a1 and 32a2 of the attachment main body 32a. More specifically, the shaft member forming the rotary shaft 32b is prevented from falling off from the pair of plate portions 32a1 and 32a2 by a flange portion provided on one end side thereof and the snap ring R attached to the other end side. In the present embodiment, the shaft member forming the rotary shaft 32b is attached to the attachment main body 32a using the snap ring R, but the attachment configuration of the shaft member is not limited to this configuration.

In addition, the second fixing member 33 to be described below is rotatably attached to the rotary shaft 32b.

The first fixing unit 12 is formed integrally with the attachment main body 32a. Although the first fixing unit 12 and the attachment main body 32a may be formed separately and fixed to each other so as to be relatively immovable, it is preferable that the first fixing unit 12 and the attachment main body 32a be integrally formed as in the present embodiment. In this manner, the number of members can be reduced, and the accuracy of the positional relationship between the first fixing unit 12 and the second fixing unit 13, which will be described below, can be enhanced. The first fixing unit 12 of the present embodiment protrudes from the connecting plate portion 32a3 (see FIG. 6) of the attachment main body 32a.

The first fixing unit 12 defines a hollow portion 12a (see FIG. 4) therein, and accommodates the transmitter 35 forming the transmission unit 15 to be described below.

The attachment main body 32a and the rotary shaft 32b of the first fixing member 32, and the first fixing unit 12 are made of, for example, a molded resin material having chemical resistance.

The second fixing member 33 includes an attachment portion 33a rotatably attached to the rotary shaft 32b of the first fixing member 32 and the second fixing unit 13.

Insertion holes 43 through which the rotary shaft 32b can be inserted are formed in the attachment portion 33a. As the rotary shaft 32b is inserted through the insertion hole 43, the attachment portion 33a is rotatably attached to the rotary shaft 32b. More specifically, the attachment portion 33a of the present embodiment includes a pair of plate portions 33a1 and 33a2 arranged to oppose each other. The insertion holes 43 are formed in the pair of plate portions 33a1 and 33a2 at positions overlapping each other in the thickness direction. The rotary shaft 32b of the present embodiment is inserted through the insertion holes 43 in both of the pair of plate portions 33a1 and 33a2.

The second fixing unit 13 is movable between the pressing position in which the infusion tube 160 (see FIG. 3 and the like) is pressed against the first fixing unit 12 in the main body 200 (see FIG. 3 and the like), and the release position in which the pressing of the infusion tube 160 against the first fixing unit 12 is released. More specifically, the second fixing unit 13 is movable between the pressing position and the release position by rotating with respect to the rotary shaft 32b. FIG. 5 illustrates a state in which the second fixing unit 13 is at the release position similarly to FIGS. 3 and 4.

More specifically, the second fixing unit 13 of the present embodiment is formed integrally with the attachment portion 33a. Therefore, the second fixing unit 13 of the present embodiment rotates with respect to the rotary shaft 32b together with the attachment portion 33a as the attachment portion 33a rotates with respect to the rotary shaft 32b. In addition, the second fixing unit 13 protrudes from the connecting plate portion 32a3 (see FIG. 6) of the attachment main body 32a in the state in which the attachment portion 33a is rotatably attached to the rotary shaft 32b.

The second fixing unit 13 of the present embodiment is configured to be rotatable with respect to the rotary shaft 32b provided in the first fixing member 32, but may be configured to be rotatable with respect to a rotary shaft provided in another member such as the main body housing 200a (see FIG. 3 and the like), for example, as long as the above-described movement between the pressing position and the release position is possible.

The second fixing unit 13 defines a hollow portion 13a (see FIG. 4) therein, and accommodates the receiver 36 forming the reception unit 16 to be described below.

The attachment portion 33a of the second fixing member 33 and the second fixing unit 13 are made of, for example, a molded resin material having chemical resistance.

The urging member 34 forms the urging unit 14 that urges the second fixing unit 13 toward the release position. In addition, the urging member 34 forming the urging unit 14 is mounted on the rotary shaft 32b. Since the urging member 34 is mounted on the rotary shaft 32b, the sensor assembly 10 can be easily miniaturized as compared with a configuration in which an urging member is arranged at a different position from the rotary shaft 32b. Therefore, the space of the entire infusion pump can be saved by mounting the urging member 34 on the rotary shaft 32b, thereby facilitating the miniaturization.

Specifically, the urging member 34 of the present embodiment is a torsion coil spring mounted on the rotary shaft 32b. As illustrated in FIGS. 6 to 8, the torsion coil spring, which is the urging member 34 of the present embodiment, includes a coil portion 21a extending in a spiral shape and locking portions 21b extending at both ends of the coil portion 21a. The torsion coil spring of the present embodiment is arranged such that the rotary shaft 32b is inserted through a hollow portion of the coil portion 21a and the coil portion 21a is placed on the outer circumference of the rotary shaft 32b. One locking portion 21b is locked to the second fixing member 33 in a state in which the coil portion 21a is arranged on the rotary shaft 32b. In addition, the other locking portion 21b is locked to a member other than the second fixing member 33. More specifically, the other locking portion 21b of the present embodiment is locked to the first fixing member 32. In this manner, the second fixing member 33 can be urged toward the release position by using an elastic force that is an urging force of the torsion coil spring. It is easy to maintain the second fixing unit 13 at the release position by urging the second fixing unit 13 of the second fixing member 33 toward the release position by the urging member 34 when the infusion tube 160 (see FIG. 3 and the like) is arranged at a position between the first fixing unit 12 of the first fixing member 32 and the second fixing unit 13 of the second fixing member 33. Therefore, when the infusion tube 160 is fixed to the infusion pump 100 (see FIG. 2 and the like), the infusion tube 160 (see FIG. 3 and the like) can be easily arranged between the first fixing unit 12 and the second fixing unit 13.

In addition, the locking portion 21b of the present embodiment is locked using through-holes 22 formed in the first fixing member 32 and the second fixing member 33 as illustrated in FIG. 8, but the configuration for locking is not limited to this configuration.

The transmitter 35 forms the transmission unit 15 disposed in the first fixing unit 12. The transmitter 35 of the present embodiment can transmit a predetermined signal toward the infusion tube 160 (see FIG. 3 and the like) sandwiched between the first fixing unit 12 of the first fixing member 32 and the second fixing unit 13 of the second fixing member 33. Examples of the predetermined signal include an ultrasonic wave. Therefore, the transmitter 35 forming the transmission unit 15 can be configured to be capable of transmitting the ultrasonic wave, for example.

In addition, the transmitter 35 of the present embodiment is arranged inside the first fixing unit 12. As described above, the first fixing unit 12 of the present embodiment is formed of the protruding portion defining the hollow portion 12a (see FIG. 4) therein. That is, the transmitter 35 of the present embodiment is arranged in the hollow portion 12a (see FIG. 4) of the first fixing unit 12.

The receiver 36 forms the reception unit 16 disposed in the second fixing unit 13. The receiver 36 in the present embodiment can receive the signal transmitted from the transmitter 35. The receiver 36 can be configured to be capable of receiving an ultrasonic wave, for example.

The receiver 36 of the present embodiment is arranged inside the second fixing unit 13. As described above, the second fixing unit 13 of the present embodiment is formed of the protruding portion defining the hollow portion 13a (see FIG. 4) therein. That is, the receiver 36 of the present embodiment is arranged in the hollow portion 13a (see FIG. 4) of the second fixing unit 13.

The seal member 37 forming the liquid obstructing unit 17 of the present embodiment obstructs the liquid from entering into the main body 200 from the outside of the main body 200 around the second fixing unit 13. Specifically, the second fixing unit 13 of the present embodiment is exposed to the outside of the main body 200, that is, the outside of the main body housing 200*a*. On the other hand, the rotary shaft 32*b* and the urging member 34 are accommodated in the main body 200, that is, inside the main body housing 200*a*. That is, the second fixing member 33 including the second fixing unit 13 of the present embodiment extends over the inside and the outside of the main body housing 200*a*. Furthermore, the second fixing member 33 including the second fixing unit 13 moves with respect to the main body housing 200*a* of the main body 200. Therefore, there is a gap between the second fixing member 33 and the main body housing 200*a*. Therefore, there is a possibility that the liquid such as the chemical solution enters into the main body 200 from the outside of the main body 200 through the above-described gap around the second fixing unit 13. The liquid obstructing unit 17 obstructs such an entry of the liquid. As a result, it is possible to suppress the liquid from adhering to the rotary shaft 32*b* and the urging member 34 inside the main body 200. That is, for example, it is possible to suppress the occurrence of a problem that the liquid such as a high-calorie infusion solution adheres to and solidifies on the rotary shaft 32*b* and the urging member 34 to cause an abnormal operation.

More specifically, the seal member 37 forming the liquid obstructing unit 17 of the present embodiment surrounds a peripheral side wall positioned at the periphery in a direction orthogonal to the extending direction of the second fixing member 33 of the present embodiment (the same direction as the protruding direction of the second fixing unit 13 in the present embodiment). In addition, the seal member 37 of the present embodiment comes into contact with the peripheral side wall of the second fixing member 33 to seal the gap around the second fixing member 33. In other words, an accommodation hole 37*a* is formed in the seal member 37 forming the liquid obstructing unit 17 of the present embodiment, and the second fixing member 33 of the present embodiment is inserted through the accommodation hole 37*a* of the seal member 37 as illustrated in FIGS. 6 and 7. Further, the peripheral side wall located in the direction orthogonal to the extending direction of the second fixing member 33 comes into contact with an inner wall of the accommodation hole 37*a*, so that the periphery of the second fixing member 33 is sealed. In this manner, the gap formed around the movable second fixing member 33 can be sealed by the seal member 37.

In addition, an annular groove 44 is formed in the peripheral side wall of the second fixing member 33 as illustrated in FIG. 4. The annular groove 44 is formed on the peripheral side wall of the second fixing member 33 closer to the attachment portion 33*a* than the position of the second fixing unit 13. The seal member 37 is fitted in the annular groove 44. As a result, the seal member 37 is suppressed from sliding on the peripheral side wall of the second fixing member 33 along the extending direction of the second fixing member 33. Therefore, a close contact state between the seal member 37 and the peripheral side wall of the second fixing member 33 is easily maintained.

Furthermore, as illustrated in FIGS. 6 and 7, another accommodation hole 37*b* for accommodating the first fixing member 32 is formed in the seal member 37 forming the liquid obstructing unit 17 of the present embodiment, in addition to the above-described accommodation hole 37*a* through which the second fixing member 33 is inserted.

In addition, the seal member 37 forming the liquid obstructing unit 17 of the present embodiment includes a deformable portion 37*c* that deforms following the movement of the second fixing unit 13 with respect to the first fixing unit 12. Specifically, the deformable portion 37*c* of the present embodiment includes a bellows-shaped portion as illustrated in FIG. 4. The bellows-shaped portion, which is the deformable portion 37*c*, is deformed so as to expand and contract along with the movement of the second fixing unit 13 between the pressing position and the release position. In the seal member 37 of the present embodiment, the bellows-shaped portion, which is the deformable portion 37*c*, is provided at least in the entire periphery of the accommodation hole 37*a*.

The seal member 37 forming the liquid obstructing unit 17 of the present embodiment is attached to the attachment main body 32*a* of the first fixing member 32. The seal member 37 can be made of, for example, an elastic member such as various rubber materials and various thermoplastic elastomers.

The control board 38 forms the control unit 18 that determines the presence or absence of the air bubble in the infusion tube 160 (see FIG. 3 and the like) based on the signal transmitted from the transmitter 35 forming the transmission unit 15 and the signal received by the receiver 36 forming the reception unit 16. Each of the transmitter 35 and the receiver 36 is electrically connected to the control board 38 by a signal line (not illustrated).

As described above, the air bubble detection sensor 1 of the main body 200 of the infusion pump 100 of the present embodiment includes the first fixing unit 12, the second fixing unit 13, the urging unit 14, the transmission unit 15, the reception unit 16, the liquid obstructing unit 17, and the control unit 18. Although the above-described first fixing unit 12, second fixing unit 13, urging unit 14, transmission unit 15, reception unit 16, liquid obstructing unit 17, and control unit 18 are configured using the sensor assembly 10 in the main body 200 of the infusion pump 100 of the present embodiment, the present invention is not limited to this configuration, and the above-described respective units may be configured using each member individually attached to the main body housing 200*a* (see FIG. 3 and the like) of the main body 200. In addition, the above-described respective units are mounted on one sensor assembly 10 (see FIG. 5) in the present embodiment, but may be separately mounted on a plurality of assemblies, and each of the plurality of assemblies may be attached to the main body housing 200*a* (see FIG. 3 and the like). However, it is preferable to adopt a configuration in which at least the first fixing unit 12 and the second fixing unit 13 are collectively mounted on one assembly and the assembly is attached to the main body housing 200*a* of the main body 200 as in the sensor assembly 10 of the present embodiment. In this manner, it is possible to increase the accuracy of the positional relationship between the first fixing unit 12 and the second fixing unit 13, which are relatively movable in the main body 200, as compared with a configuration in which the first fixing unit 12 and the second fixing unit 13 are mounted on separate assemblies.

Figure 9:
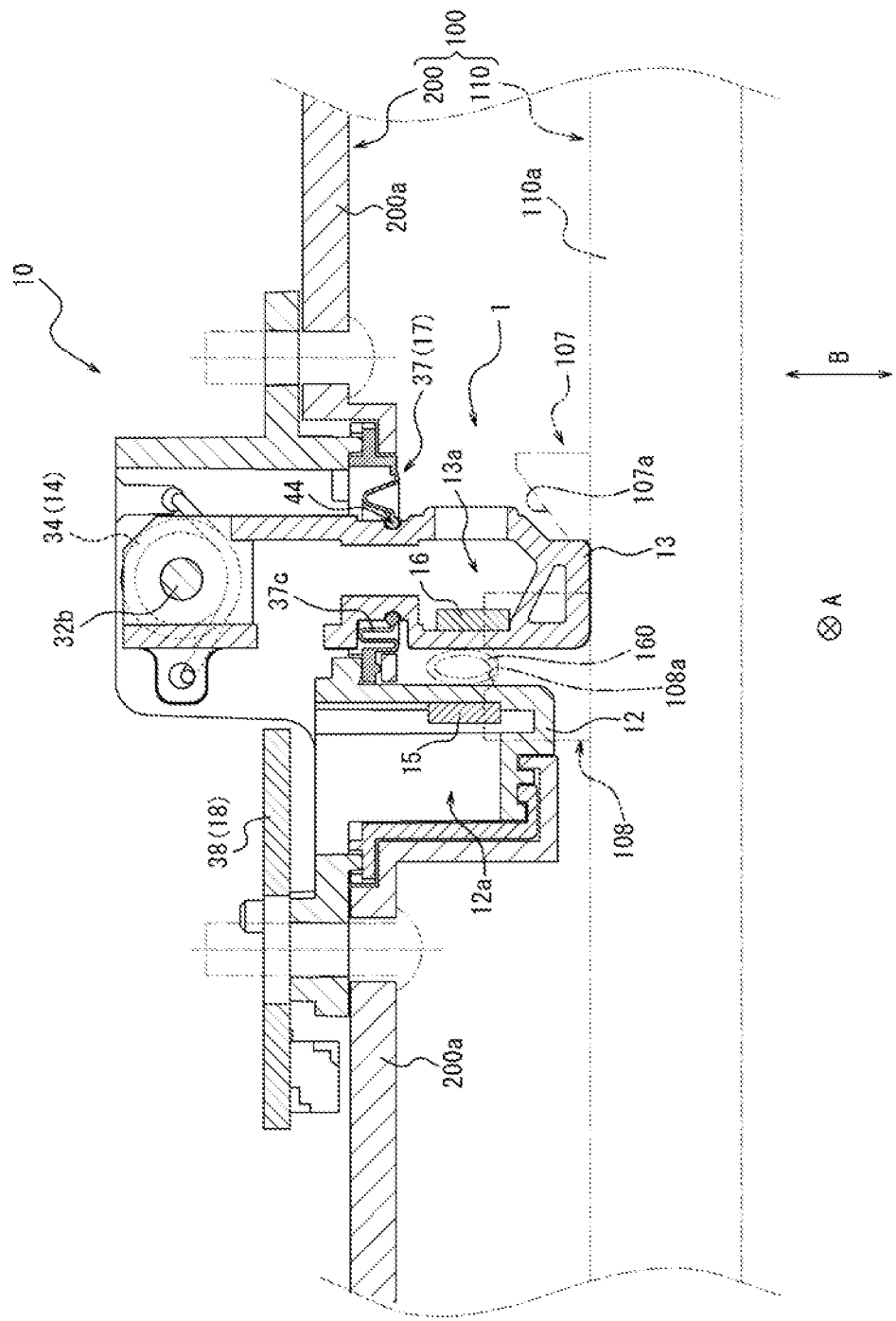
FIG. 9 is a cross-sectional view illustrating a cross section at the same position as that in FIG. 4 while the door is in a closed state.

Next, an operation of each unit when the state of the door 110 is changed from the open state (see FIGS. 3 and 4) to the closed state will be described. FIG. 9 is a cross-sectional view illustrating a cross section at the same position as that in FIG. 4 while the door 110 is in the closed state.

When the door 110 is moved so as to approach the main body 200 from the state illustrated in FIG. 4, that is, the door 110 is closed with respect to the main body 200 (see a two-dot chain line arrow in FIG. 4), the pressing portion 107 of the door 110 presses the second fixing unit 13 toward the pressing position against the urging force (elastic force in this example) of the torsion coil spring that is the urging member 34. More specifically, the pressing portion 107 provided on the back surface side of the door 110 of the present embodiment is formed of a protruding portion protruding toward the back surface side of the door 110. The pressing portion 107 is formed integrally with the door housing 110a, for example. In addition, the protruding portion, which is the pressing portion 107, is provided with a sliding surface 107a that presses the second fixing unit 13 so as to approach the first fixing unit 12 while sliding on the second fixing unit 13 when the door 110 is closed with respect to the main body 200. The sliding surface 107a is formed of an inclined surface inclined with respect to a thickness direction B of the door 110. As a result, changing the state of the door 110 from the open state (see FIG. 4) to the closed state (see FIG. 9) in the infusion pump 100 of the present embodiment makes it possible for the sliding surface 107a of the pressing portion 107 to press the second fixing unit 13 against the urging force of the urging member 34 and to move the second fixing unit 13 from the release position to the pressing position.

In addition, when the door 110 is closed with respect to the main body 200, the position holding portion 108 provided on the back surface side of the door 110 abuts on the infusion tube 160 to hold the position of the infusion tube 160 between the first fixing unit 12 and the second fixing unit 13 as illustrated in FIGS. 3, 4, and 9. The position holding portion 108 of the present embodiment is formed of a protruding portion protruding toward the back surface side of the door 110. In addition, the position holding portion 108 is formed integrally with the door housing 110a, for example. Since the position holding portion 108 is provided, it is possible, for example, to suppress slippage of the infusion tube 160 between the first fixing unit 12 and the second fixing unit 13 and detachment of the infusion tube 160 from a portion between the first fixing unit 12 and the second fixing unit 13 when the state of the door 110 is changed from the open state (see FIG. 4 and the like) to the closed state (see FIG. 9). That is, the position of the infusion tube 160 in the thickness direction B of the door 110 can be restricted by the position holding portion 108. In FIGS. 3, 4, and 9, the position of the position holding portion 108 is indicated by a two-dot chain line for convenience of the description.

In addition, the position holding portion 108 includes a curved recess 108a that receives an outer peripheral surface of the infusion tube 160, as illustrated in FIGS. 3, 4, and 9. As a result, the infusion tube 160 is fitted into the curved recess 108a. Therefore, the position holding portion 108 can guide the infusion tube 160 to a more accurate position between the first fixing unit 12 and the second fixing unit 13.

Furthermore, the position holding portion 108 is provided, with respect to the pressing portion 107, in both the feeding direction A, which is the flow path downstream side of the infusion tube 160 (see FIG. 1 and the like) fixed to the main body 200 and the direction opposite to the feeding direction A, which is the flow path upstream side of the infusion tube 160 (see FIG. 1 and the like) fixed to the main body 200, as illustrated in FIG. 2. In this manner, the infusion tube 160 can be guided to a more accurate position between the first fixing unit 12 and the second fixing unit 13.

Next, a positional relationship among the respective units in the main body 200 when the door 110 is in the closed state will be described with reference to FIG. 9.

As illustrated in FIG. 9, the rotary shaft 32b and the urging member 34 of the present embodiment are located on the opposite side of the door 110 across the second fixing unit 13 in the closed state in which the door 110 is closed with respect to the main body 200. Since the rotary shaft 32b and the urging member 34 are arranged in this manner, a rotating mechanism configured to rotate the second fixing unit 13 and an urging mechanism configured to urge the second fixing unit 13 are easily arranged together in the vicinity of the back surface side of the second fixing unit 13. Therefore, the rotating mechanism and the urging mechanism of the second fixing unit 13 can be easily miniaturized, and as a result, the miniaturization of the infusion pump 100 can be easily realized.

In addition, the seal member 37 forming the liquid obstructing unit 17 of the present embodiment is arranged on the side opposite to the door 110 side with respect to the transmission unit or the reception unit (the reception unit 16 in the present embodiment) disposed in the second fixing unit 13 as well as on the door 110 side with respect to the rotary shaft 32b and the urging member 34, in the closed state in which the door 110 is closed with respect to the main body 200, as illustrated in FIG. 9.

More specifically, the first fixing unit 12 and the second fixing unit 13 of the present embodiment are exposed to the outside on the front surface side of the main body housing 200a. On the other hand, the rotary shaft 32b and the urging member 34 of the present embodiment are accommodated in the main body housing 200a. The seal member 37 forming the liquid obstructing unit 17 of the present embodiment seals the gaps formed among the first fixing member 32 including the first fixing unit 12, the second fixing member 33 including the second fixing unit 13, and the main body housing 200a. Therefore, it is possible to suppress the liquid from entering into the main body 200 in which the rotary shaft 32b and the urging member 34 are accommodated through the gaps formed among the first fixing member 32 including the first fixing unit 12, the second fixing member 33 including the second fixing unit 13, and the main body housing 200a by the seal member 37 forming the liquid obstructing unit 17 of the present embodiment.

The infusion pump according to the present disclosure is not limited to the specific configurations described in the above embodiments, and various modifications and changes can be made without departing from the scope of the claims. Although the transmission unit 15 is disposed in the first fixing unit 12 and the reception unit 16 is disposed in the second fixing unit 13 in the above-described embodiment, it may be configured such that the reception unit 16 is disposed in the first fixing unit 12 and the transmission unit 15 is disposed in the second fixing unit 13.

REFERENCE NUMERAL LIST 1 air bubble detection sensor
2 pump mechanism
3 occlusion sensor
4 tube clamp holding portion
5 release lever
6 tube regulating portion
7 handle
10 sensor assembly
12 first fixing unit
12a hollow portion
13 second fixing unit
13a hollow portion
14 urging unit
15 transmission unit
16 reception unit
17 liquid obstructing unit
18 control unit
21a coil portion 21b locking portion
22 through-hole
32 first fixing member
32a attachment main body
32a1, 32a2 plate portion
32a3 connecting plate portion
32b rotary shaft
33 second fixing member
33a attachment portion
33a1, 33a2 plate portion
34 urging member
35 transmitter
36 receiver
37 seal member
37a accommodation hole
37b accommodation hole
37c deformable portion
38 control board
41 insertion hole
42 attachment hole
43 insertion hole
44 annular groove
100 infusion pump
107 pressing portion
107a sliding surface
108 position holding portion
108a curved recess
110 door
110a door housing
120 display unit
121 flow rate display unit
122 planned amount/integrated amount display unit
123 alarm display unit
124 occlusion pressure setting display unit
125 air bubble detection display unit
126 battery voltage drop display unit
127 occlusion abnormality display unit
128 door open state display unit
129 completion display unit
130 operation unit
131 up/down switch
132 fast delivery switch
133 stop switch
134 start switch
135 power switch
136 power lamp
137 battery lamp
140 door lock lever
150 operation indicator
160 infusion tube
161 infusion bag
162 clamp member
163 indwelling needle
200 main body
200a main body housing
202 hinge
203 door seal rubber
204 buffer plate mechanism
205 occlusion pressing plate
214a to 214e finger
A feeding direction
B thickness direction of door
R snap ring

The invention claimed is:

1. An infusion pump comprising:
a main body configured to have an infusion tube fixed thereto, wherein the main body comprises:
a main body housing,
a first fixing member comprising a first fixing unit,
a rotary shaft,
a second fixing member comprising:
an attachment portion rotatably attached to the rotary shaft, and
a second fixing unit that is movable between (i) a pressing position in which the infusion tube is pressed against the first fixing unit, and (ii) a release position in which the pressing of the infusion tube against the first fixing unit is released, by being rotated with respect to the rotary shaft,
an urging unit configured to urge the second fixing unit toward the release position, the urging unit comprising an urging member mounted on the rotary shaft,
a seal member that extends around and contacts a peripheral side wall of the second fixing member,
a transmission unit that is disposed in one of the first fixing unit and the second fixing unit and that is configured to transmit a signal toward the infusion tube sandwiched between the first fixing unit and the second fixing unit, and
a reception unit that is disposed in the other of the first fixing unit and the second fixing unit and that is configured to receive the signal transmitted from the transmission unit, wherein:
the rotary shaft, the urging unit, and a first portion of the second fixing member are located in a space defined by the main body housing and the seal member,
the second fixing unit of the second fixing member is located outside the space defined by the main body housing and the seal member, and
the seal member is configured to obstruct liquid from entering the space defined by the main body housing and the seal member from outside the space.

2. The infusion pump according to claim 1, further comprising:
a door that is attached to be openable and closable with respect to the main body,
wherein the door comprises a pressing portion that presses the second fixing unit toward the pressing position against an urging force of the urging member when the door is closed with respect to the main body.

3. The infusion pump according to claim 2, wherein the rotary shaft and the urging member are located on a side opposite to the door across the second fixing unit and the door in a state in which the door is closed with respect to the main body.

4. The infusion pump according to claim 2, wherein the door comprises a position holding portion that abuts on the infusion tube and holds a position of the infusion tube between the first fixing unit and the second fixing unit when the door is closed with respect to the main body.

5. The infusion pump according to claim 4, wherein the position holding portion includes a curved recess that receives an outer peripheral surface of the infusion tube.

6. The infusion pump according to claim 4, wherein the position holding portion is provided with respect to the pressing portion in both a feeding direction of the infusion tube fixed to the main body and a direction opposite to the feeding direction.

7. The infusion pump according to claim 1, wherein the seal member extends around and contacts a peripheral side wall of the first fixing member.

8. The infusion pump according to claim 7, wherein the seal member comprises a deformable portion that deforms following movement of the second fixing unit with respect to the first fixing unit.

9. An infusion pump configured to have an infusion tube fixed thereto, the infusion pump comprising:
a main body housing;
a first fixing member comprising a first protruding portion that is immovably fixed to the main body housing and protrudes frontward from the main body housing;
a rotary shaft;
a second fixing member comprising:
an attachment portion rotatably attached to the rotary shaft, and
a second protruding portion that is movable, with respect to the main body housing, between (i) a pressing position in which the infusion tube is pressed against the first protruding portion, and (ii) a release position in which the pressing of the infusion tube against the first protruding portion is released, by being rotated with respect to the rotary shaft;
a torsion coil mounted on the rotary shaft and configured to urge the second protruding portion toward the release position;
a seal member that extends around and contacts a peripheral side wall of the second fixing member;
a transmitter that is disposed in one of the first protruding portion and the second protruding portion and that is configured to transmit a signal toward the infusion tube sandwiched between the first protruding portion and the second protruding portion;
a receiver that is disposed in the other of the first protruding portion and the second protruding portion and that is configured to receive the signal transmitted from the transmitter; and
a control unit configured to detect a presence or absence of an air bubble in the infusion tube based on the signal, wherein:
the rotary shaft, the torsion coil, and a first portion of the second fixing member are located in a space defined by the main body housing and the seal member,
the second protruding portion of the second fixing member is located outside the space defined by the main body housing and the seal member, and
the seal member is configured to obstruct liquid from entering the space defined by the main body housing and the seal member from outside the space.

10. A method for detecting a presence or absence of an air bubble in an infusion tube, the method comprising:
providing an infusion pump configured to have the infusion tube fixed thereto, the infusion pump comprising:
a main body housing,
a first fixing member comprising a first protruding portion that is immovably fixed to the main body housing and protrudes frontward from the main body housing,
a rotary shaft;
a second fixing member comprising:
an attachment portion rotatably attached to the rotary shaft; and
a second protruding portion that is movable, with respect to the main body housing, between (i) a pressing position in which the infusion tube is pressed against the first protruding portion, and (ii) a release position in which the pressing of the infusion tube against the first protruding portion is released, by being rotated with respect to the rotary shaft,
a torsion coil mounted on the rotary shaft and configured to urge the second protruding portion toward the release position,
a seal member that extends around and contacts a peripheral side wall of the second fixing member;
a transmitter that is disposed in one of the first protruding portion and the second protruding portion and that is configured to transmit a signal toward the infusion tube sandwiched between the first protruding portion and the second protruding portion, and
a receiver that is disposed in the other of the first protruding portion and the second protruding portion and that is configured to receive the signal transmitted from the transmitter, wherein:
the rotary shaft, the torsion coil, and a first portion of the second fixing member are located in a space defined by the main body housing and the seal member,
the second protruding portion of the second fixing member is located outside the space defined by the main body housing and the seal member, and
the seal member is configured to obstruct liquid from entering the space defined by the main body housing and the seal member from outside the space; and
detecting, with a control unit, the presence or absence of the air bubble in the infusion tube based on the signal.

* * * * *